United States Patent [19]
Schweitzer et al.

[11] 4,130,863
[45] Dec. 19, 1978

[54] OPTIMIZING CONTROL SYSTEM

[75] Inventors: Paul H. Schweitzer; Thomas W. Collins, both of State College, Pa.

[73] Assignee: Optimizer Control Corp., Burnsville, Minn.

[21] Appl. No.: 845,804

[22] Filed: Oct. 27, 1977

[51] Int. Cl.$^2$ .................... G05B 13/02; G06F 15/46
[52] U.S. Cl. ................... 364/105; 123/32 EA; 123/148 E; 235/92 T; 364/431
[58] Field of Search ............... 364/100, 105, 106, 111, 364/112, 431, 488, 569; 235/92 CP, 92 T, 92 TF, 92 CT; 123/32 EA, 32 EB, 32 EC, 148 E; 318/561

[56] References Cited
U.S. PATENT DOCUMENTS

| | | | |
|---|---|---|---|
| 3,921,610 | 11/1975 | Hartig | 123/148 E |
| 3,955,723 | 5/1976 | Richards | 123/148 E |
| 3,984,663 | 10/1976 | De Buhr | 364/105 |
| 4,038,526 | 7/1977 | Eccles | 364/105 |

*Primary Examiner*—Joseph F. Ruggiero
*Attorney, Agent, or Firm*—Orrin M. Haugen; Thomas J. Nikolai

[57] ABSTRACT

A digital electronic control system for optimizing the performance of an energy consuming system wherein a given parameter, such as the air supply in a furnace, the spark setting in an internal combustion engine, or the pitch of a propeller in an aircraft is perturbated and the resulting effect on the machine or system performance is computed for producing a control signal which is then used to adjust the setting in a way which improves the performance. The process continues until an incremental change in setting no longer is accompanied by an improvement in the system's output, thus indicating operation at the optimum. The control apparatus of the present invention permits the selective introduction of desired bias values so that operation can be established off the optimum by a predetermined amount.

9 Claims, 4 Drawing Figures

4,130,863

OPTIMIZING CONTROL SYSTEM

BACKGROUND OF THE INVENTION

I. Field of Invention

This invention relates generally to apparatus for optimizing the performance of energy consuming machines or systems and more specifically to an improved digital electronic device for sampling the effect on the performance of such a machine or system of an incremental change in the setting of a control parameter and using the resulting information resulting from the sampling process to adjust the setting in a way which tends to optimize the system performance.

II. Description of Prior Art

In the Schweitzer et al. U.S. Pat. No. 4,026,251 there is described an optimizing control system of which the present invention is deemed to be an improvement. In accordance with the teachings of the aforementioned Schweitzer et al Patent, an electronic oscillator is provided for producing "dither" pulses of a relatively long duration and low repetition rate. These dither pulses are applied to a suitable transducer such as an electric motor or solenoid which, in turn, is used to produce a slight variation in a system control parameter of a machine. Coupled to the output of the machine is an electrical pulse generating device (termed a "celsig") which produces pulses of a relatively high rate compared to the rate at which the dither pulses are produced by the oscillator. These high frequency pulses are produced at a rate which is directly proportional to the output of the machine. The dither pulses are also applied to timing networks which effectively divide the dither pulses into segments. The output of the timing networks are coupled through coincident circuits (AND gates) to the input terminals of an up-down pulse counting network. Applied to second input of these AND gates are the high frequency pulses whose rate is proportional to the instantaneous output of the machine. Thus, during a first portion of a dither cycle, the counter network counts up the number of high frequency pulses received and subsequently, during a second equal portion of the dither cycle, the counter network is decremented by the number of high frequency pulses received during this known second time interval. If the count passes through zero, it is known that the system output has increased as a result of the dithering of the controlling parameter. However, if the count remains positive during the countdown period, it is known that the engine output has decreased. Thus, the counter serves to develop the algebraic difference of the high rate pulses (which are proportional to the machine or system output) which occur during successive intervals of a dither pulse. The output from the up-down counter is coupled through a logic device including flip-flops and gates to a suitable transducer whose output is used to either increase or decrease the parameter setting so as to optimize the machine performance.

In the aforementioned Schweitzer et al Patent, it was necessary that the dither oscillator 53 therein remain constant in frequency in that the RC delay times of the one-shot circuits 66 and 74 were used to establish the count-up and count-down periods of the counter 108. Because the periods during which the one-shot circuits are active are essentially fixed for any given setting of the RC time constant, it can be seen that variations in the frequency of the dither oscillator 53 can result in somewhat erratic operation in that the initiation of the one-shot circuit period is related to the frequency of the dither oscillator whereas the termination of the period is a function of the fixed RC parameters. Then too, for reliable operation it is required that precision, and therefore expensive, components be used in the timing network on the one-shot circuit 66 and 74.

The circuit arrangements of the present invention obviate these problems by completely eliminating the analog components i.e., the one-shot circuit and their associated RC time delay networks. Thus, in accordance with the teachings of the present invention, the system is independent of any changes in clock frequency and the accuracy of the system remains fixed, independent of any such clock frequency changes.

In addition to the foregoing improvement in accuracy, the system of the present invention is also designed to permit the selective insertion of differing bias values. As was described in the aforereferenced Schweitzer et al Patent, if for any reason optimum setting is not desired, for instance because of some restraints or considerations make its use objectionable, the technique of biasing can deliver near optimum settings, off optimum by a predetermined amount.

In the circuit of FIG. 3 of the prior art Schweitzer Patent, the advance periods and retard periods are divided into two equal segments each, and in the unbiased case the counting is reversed at the midpoint of each segment. However, if the segments are made unequal, the upcounts and downcounts will be different. To accomplish biasing, the periods that the two one-shot-circuits 66 and 74 were active as determined by their associated RC time constant networks were made unequal. Thus, a preference could be given to the upcount portion of a dither cycle or to the downcount portion of this cycle. Again, establishing the desired bias was a function of analog components which added to the cost and instability of the system. It is significant to note that whereas the prior art used the adjustment of two numbers in order to achieve biasing, the present invention allows biasing through the selection of only one such number, again simplifying the circuitry.

SUMMARY OF THE INVENTION

In accordance with the teachings of the present invention, bias values are added in the form of digital numbers which are loaded into a counter upon command from the circuit. The source of the bias value can be a fixed, prewired connection board or, alternatively, it is possible to preprogram bias values which will be entered into the counter in accordance with variations in a machine or system parameter such as acceleration. This added flexibility is deemed to be a significant improvement over the prior art digital system of the Schweitzer U.S. Pat. No. 4,026,251.

It is therefore a primary object of the present invention to provide new and improved implementations of a solid state, digital, electronic machine optimizer device which is more reliable in its operation and more flexible in its application than known prior art arrangements of similar devices.

In practicing the invention, in a first embodiment, first, second, third and fourth digital downcounters are provided which are adapted to be loaded with differing digital values and to be decremented by a clock oscillator. Specifically, the first downcounter is adapted to be loaded with a digital value representative of a desired bias value. The second counter receives a digital value indicative of a predetermined total perturbation period.

The third digital downcounter is adapted to be loaded with a digital value representing a desired delay interval during which counting of celsig pulses is inhibited while the fourth counter receives a digital value corresponding to a desired one quarter dither period. All four downcounters work in a fashion such that a number is initially loaded into them and the downcounters will provide an output after that number of pulses have been received at their decrement input, generally from the clock source. This technique is used rather than counters and comparators because it requires fewer components. The timing section can therefore conveniently accommodate "biasing" by adjusting the time relationship between advance and retard periods. As the advance period determined by the first downcounter is made longer, the retard period becomes shorter to thereby effect an offset in the advance direction. Of course, the reverse is also true.

The pulses which are directly proportional to the output of the device being controlled are entered into an up/down counter under control of the four downcounters previously mentioned. The output from the up/down counter is, in turn, applied to a decision circuit embodying conventional digital logic devices which serve to produce an output indicative whether an advance or a retard control signal to the system's parameter setting will improve its performance.

In a second embodiment, so-called "unidirectional dithering" is employed. Specifically, rather than perturbating a system control setting back and forth on either side of a given setting, the optimizing device continually and iteratively steps the setting in a given direction until such time that the optimizing device detects a degradation in system performance. At that time, the process is reversed and the parameter setting is adjusted in the opposite direction in incremental steps, thereby homing in on the optimum setting. Again, a biasing technique may be employed to allow the device to home in on a setting which is off optimum by a desired amount.

Again, in the implementation of the arrangement employing unidirectional dithering, digital devices including flip-flops, gates, and counters are employed throughout and all analog devices are eliminated.

BRIEF DESCRIPTION OF THE DRAWINGS

Other objects, features and many of the attendant advantages of this invention will be appreciated more readily as the same becomes better understood by reference to the following detailed description when considered in connection with the accompanying drawings in which.

DETAILED DESCRIPTION OF PREFERRED EMBODIMENTS

Figure 1:
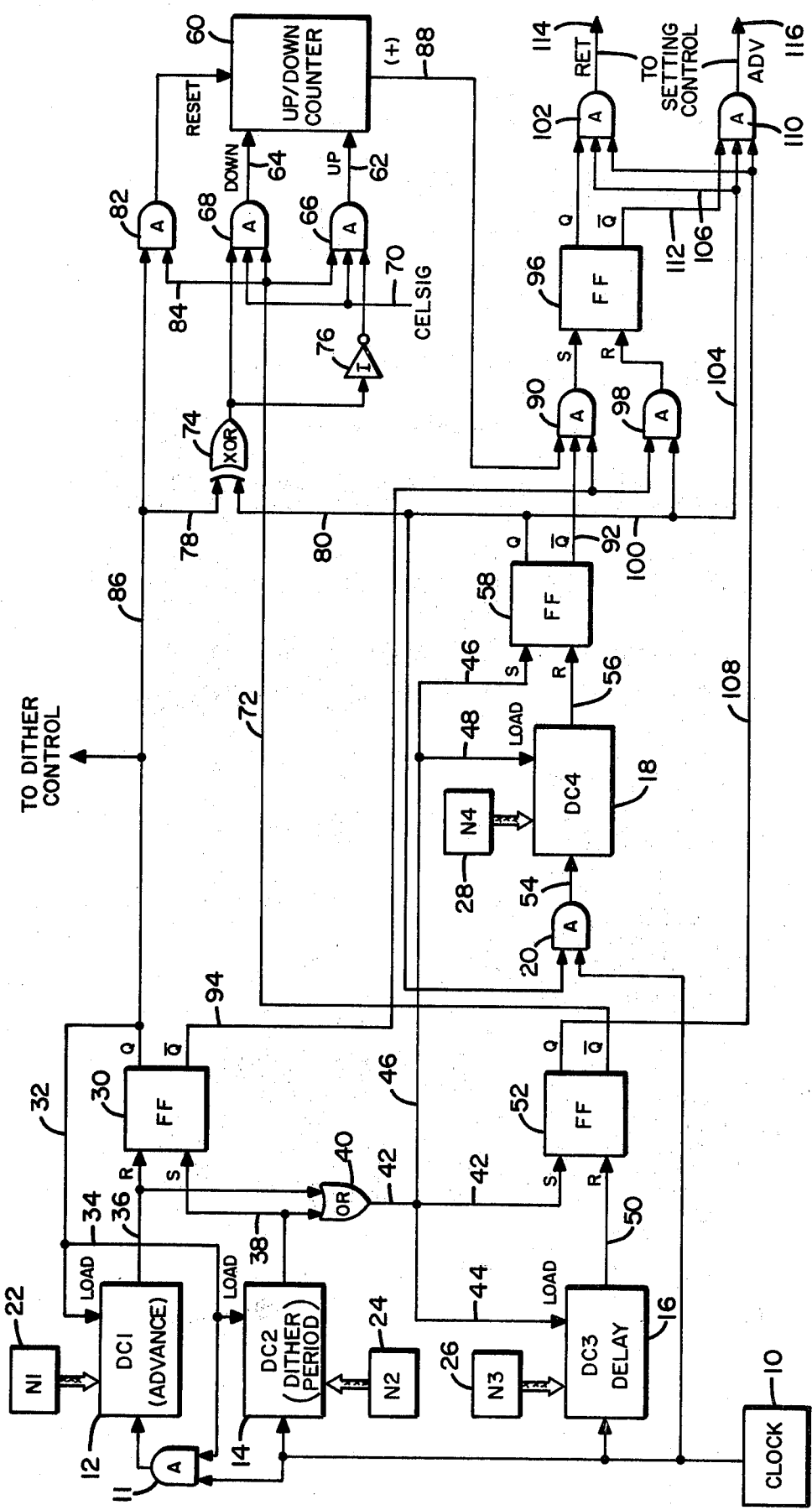
FIG. 1 illustrates by means of a logical block diagram one preferred embodiment of the present invention.

Referring to the drawing of FIG. 1, there is identified by numeral 10 a clock source or regularly occurring clock pulses. The frequency of the source 10 may, for example, be 2.5KHZ. The output from the clock 10 is applied to the input terminal of a first downcounter 12 by way of a two input AND gate 11, a second downcounter 14, a third downcounter 16 and to a fourth downcounter 18 by way of an AND gate 20. The downcounter 12 is adapted to be loaded with a binary number indicative of a desired bias value. The source 22 may comprise a storage register with programmed or adjustable bias or may be a hard-wired device of known construction. Similarly, the second digital counter 14 is adapted to receive a binary number from a source 24 which, like source 22, may be an alterable register or a hard-wired device. Downcounters 16 and 18 each have associated with them a source of binary numbers 26 and 28 respectively. The number $N_3$ entered into downcounter 16 provides a predetermined delay and the number $N_4$ entered into downcounter 18 by way of source 28 is a binary number indicative of one fourth of the dither period.

The loading of counters 12 and 14 is under control of a flip-flop 30 of the set-reset type. Specifically, the Q output from flip-flop 30 is applied by way of conductors 32 and 34 to the "Load" inputs of the downcounters 12 and 14. A signal on these last mentioned conductors serve to enable gates (not shown) included in the downcounters 12 and 14 for permitting the entry of the source values from devices 22 and 24 into the counter register. When the counter 12 decrements to zero, an output is produced on conductor 36 to reset the flip-flop 30. AND gate 11 then inhibits the downcounter 12 from receiving any more pulses until the downcounter 14 sets the flip-flop 30. Similarly, when downcounter 14 is decremented to zero an output is produced on conductor 38 to set the flip-flop 30. Since the total dither period is defined by the time it takes to decrement the binary number $N_2$ to zero and the advance portion of the dither period is defined by the time required to decrement the number $N_1$ to zero, the retard portion of the dither period is defined by the difference $N_2 - N_1$. The Q output from flip-flop 30 is also coupled to the "dither control" which is not shown but which is a part of the system being regulated and serves to produce periodic incremental variations in the parameter setting.

The outputs from the counters 12 and 14 are also applied to the inputs of an OR circuit 40. Thus, when either counter 12 or counter 14 is decremented to zero, OR circuit 40 will produce an output on conductor 42 which, in turn, is connected by way of a conductor 44 to the "Load" input terminal of downcounter 16 and by way of conductors 46 and 48 to the "Load" terminal of the downcounter 18.

The output from downcounter 16 is applied by way of conductor 50 to the reset terminal of a set-reset type flip-flop 52. The set terminal of this flip-flop is connected by way of a conductor 42 to the output of the OR gate 40. AND gate 20 will be enabled by the Q output from the flip-flop 58 such that clock pulses from the source 10 may pass therethrough to the decrement terminal 54 of the downcounter 18.

When the downcounter 18 is decremented to zero, it will produce an output on conductor 56 which is connected to the reset terminal of flip-flop 58. The Q output of flip-flop 58 will inhibit AND gate 20 stopping the input to downcounter 18. The set terminal of this last mentioned flip-flop is connected to the output of OR gate 40 by way of conductors 42 and 46.

The circuitry thus far described is concerned with the basic timing networks for the device. Consideration will next be given to the portion of the network which accumulates celsig pulses during successive time periods established by the downcounters 12, 14, 16 and 18. The heart of this last mentioned network is an up/down counter 60. Signals applied to the counter 60 by way of its input 62 cause the contents thereof to increase whereas pulses applied to the "down" terminal 64 cause the value in the counter to be decremented for each pulse received. First and second AND gates 66 and 68 govern the application of incrementing and decrementing pulses to the counter 60. Signals of a frequency proportional to the machine's output are applied by way of a conductor 70 to a first input terminal on each of the AND gates 66 and 68. A second input terminal of these last mentioned gates arrives by way of a conductor 72 from the $\bar{Q}$ output of the flip-flop 52. This signal will be low when the flip-flop 52 is set and high when the flip-flop 52 is in its reset state.

An Exclusive OR circuit 74 has its output connected directly to AND gate 68 and through an inverter 76 to the third input terminal of the AND gate 66. The Exclusive OR circuit 74 has two input terminals. The first is connected by way of a conductor 78 to the Q output terminal of the flip-flop 30. The second input to Exclusive OR circuit 74 comes by way of a conductor 80 from the Q output of the flip-flop 58. Thus, the output from Exclusive OR gate 74 will be high when either flip-flop 30 or flip-flop 58 (but not both) is set. If both are set or reset, the output from Exclusive OR gate 74 will be low.

The up/down counter 60 may be reset by a pulse applied to its reset terminal when the AND gate 82 is fully enabled. AND gate 82 has two inputs, one being connected by way of conductors 72 and 84 to the $\bar{Q}$ output of flip-flop 52 and the second input being connected by way of a conductor 86 to the Q output of the flip-flop 30.

The up/down counter 60 is designed to provide an output pulse on conductor 88 whenever the counter 60 is incremented through zero. This output is applied by way of conductor 88 to a first input of an AND circuit 90. The $\bar{Q}$ output from flip-flop 58 is also applied by way of conductor 92 to a second input of AND gate 90. The third input to this gate comes from the $\bar{Q}$ output from flip-flop 30 by way of conductor 94. The output from AND gate 90 is applied to the set input terminal of a flip-flop 96. The reset terminal of flip-flop 96 is connected to the output of an AND gate 98. This last mentioned gate has two inputs, one being connected to the conductor 94 and the second being connected to the Q output of flip-flop 58 by way of a conductor 100.

The Q output from flip-flop 96 is applied as a first input to AND gate 102. This gate receives a second input by way of conductors 100, 104 and 106 from the Q output of flip-flop 58. The third input to AND gate 102 comes from the Q output of flip-flop 52 by way of a conductor 108. Conductors 104 and 108 are also connected to first and second input terminals of AND gate 110. The third input to this last mentioned gate arrives by way of a conductor 112 from the $\bar{Q}$ output of flip-flop 96.

As will be explained more fully hereinbelow when the operation of the embodiment of FIG. 1 is described, the output signal appearing on conductor 114 from AND gate 102 indicates to the system that the machine setting should be retarded in order to obtain better engine performance. Similarly, an output signal on conductor 116 from AND gate 110 indicates that the setting should be advanced in order to improve performance.

This completes the detailed description of the construction and interconnections of the various digital logic devices comprising the embodiment of FIG. 1. Consideration will now be given to the mode of operation of this arrangement.

OPERATION — FIG. 1

The machine optimizer of FIG. 1 operates on a principle related to that disclosed in the Schweitzer et al. U.S. Pat. No. 4,026,251. More specifically, a dithering principle is employed wherein periodic perturbations in a machine setting are introduced and the corresponding change in output performance is monitored. In the aforementioned Schweitzer et al Patent, where a change in machine setting in the advance direction is accompanied by an improvement in performance, a signal is produced to cause a further advance in the machine setting. However, if a setting change in the advance direction results in degraded performance, then a signal is produced for effecting a change in the machine setting in the retard direction. Similarly, if during the retard portion of the dither cycle improved machine performance is noted, then the optimizer generates a signal for effecting a change in the retard direction, but if in the retard portion of the dither cycle machine performance is degraded, a signal is produced to effect a change in machine setting in the advance direction. In the systems of the present invention, the logic is arranged such that a control signal to the system being "optimized" is provided only at the conclusion of each complete dither cycle, thereby allowing simplification since only one signal is used for control information whereas the prior art required two such signals.

Figure 3:
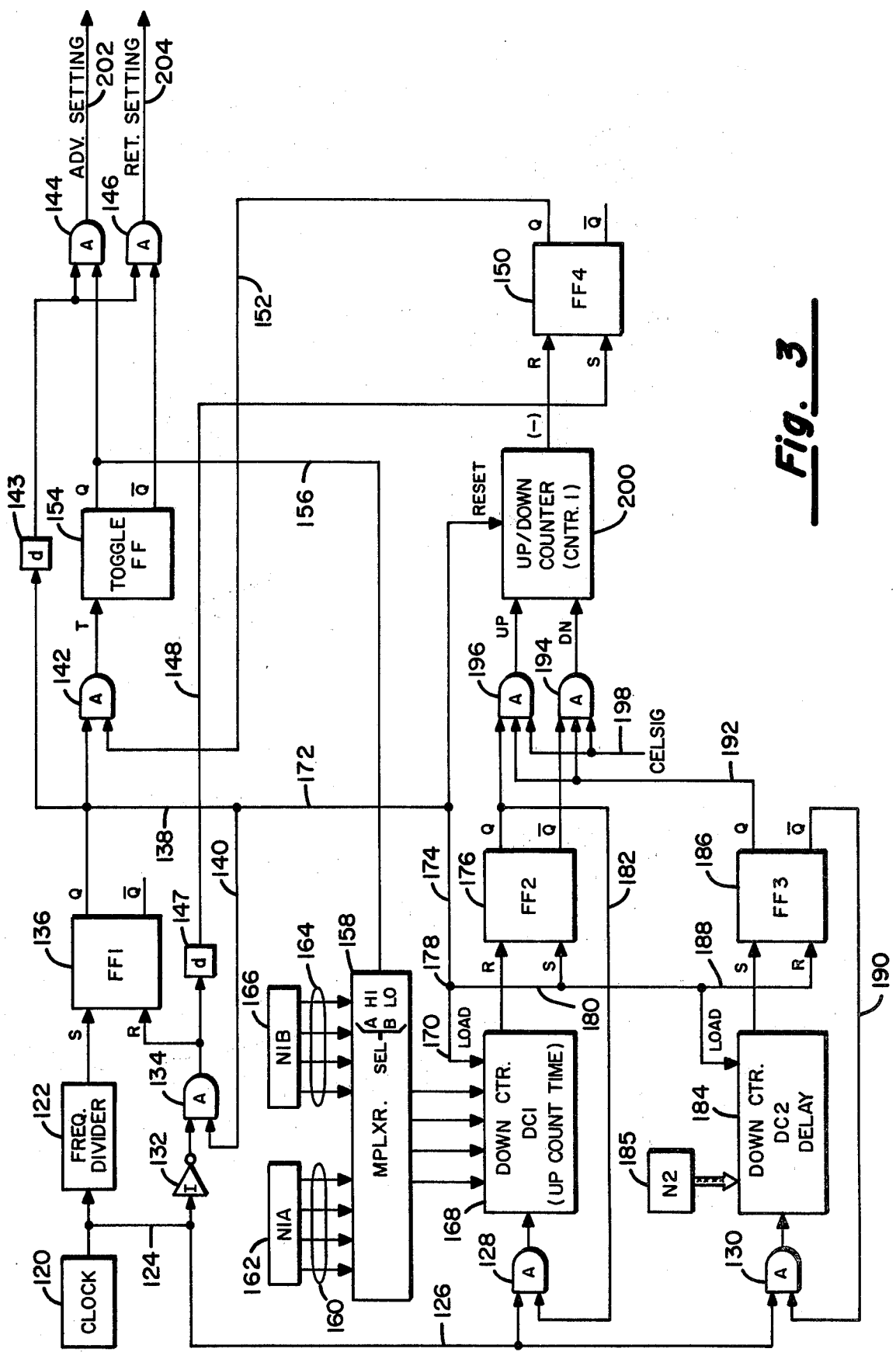
FIG. 3 illustrates by means of a logical block diagram an alternative preferred embodiment of the present invention.

The term "dithering" as used in connection with FIG. 1 implies a perturbation back and forth about a given system parameter control setting. As will be explained when the device of FIG. 3 is considered, the perturbation purposely introduced may be unidirectional in nature. Hence, if an incremental change is made in the machine setting in the "advance" direction and it is accompanied by a corresponding improvement in machine performance, the setting will again be advanced incrementally and the process continues until further advances result in degraded performance. At this time the logic dictates incremental changes in the opposite direction until the optimum system performance is noted. Likewise, it is within the scope of the invention to adaptively vary the amount by which the system control parameter is adjusted so that the optimum system performance is achieved more rapidly, or to a closer extent. This would be analogous to "vernier tuning".

In applying the invention to an internal combustion engine, the engine parameter to be dithered may be spark setting, the air/fuel ratio or other suitable parameters. In such an application, the output sensor (celsig) may be a notched wheel connected to the output shaft which has associated with it a variable reluctance magnetic pickup, the combination producing pulses at a rate which is directly proportional to shaft speed. In applying the invention to a heating system wherein the air/fuel consumption is varied to optimize heating efficiency, the celsig may take the form of a thermocouple/voltage controlled oscillator (VCO) to generate pulses at a rate proportional to furnace temperature. Similarly, it is possible to visualize a variety of other arrangements whereby one may obtain a digital pulse rate which bears a direct relationship to a physical quantity being monitored and controlled such that the present invention can be readily applied to a variety of machines or systems.

The dither pulser alternates the machine setting at a relatively low rate, e.g., 10 cycles per second or less. It also divides the advance and the retard portions of the dither cycle into two parts each. The celsig pulser generates pulses at a much higher frequency proportional to the output. A correlator is provided which counts the number of celsig pulses during any dither segment and compares the consecutive counts. The comparison furnishes information on whether the counts have increased or decreased during the two dither segments. It then reports the results to logic circuits which produce the control signals for effecting a change in the machine setting.

If for any reason optimum setting is not desired, for instance because some restraints or considerations make its use objectionable, the technique of biasing can deliver near optimum settings, off optimum by a selectable amount. The technique of biasing which is employed in the disclosed embodiment of this invention may be referred to as a "miscounting" technique. The essence of this technique is that the logic is deceived by feeding "false" information to it. The logic determines the presence of output improvement by noting an increase in pulse density in successive time intervals. Pulse density in a digital optimizer is proportional to the machine output. Because the logic circuitry determines pulse density by counting pulses in successive equal time intervals, if the intervals are unequal, equal counts do not signify equal pulse density. In an unbiased mode of operation, the advance periods and the retard periods are divided into two equal segments each, and in each case the counting is reversed at the midpoint of the cycle. However, if the segments are made unequal, the upcounts and downcounts will be different. For example, if the retard "half" of the dither period is made slightly longer in time duration while the advance "half" is made slightly shorter, the difference between the two counts will be distorted in favor of retard. The machine optimizer will then home in on a setting which is biased toward retard.

Figure 2:
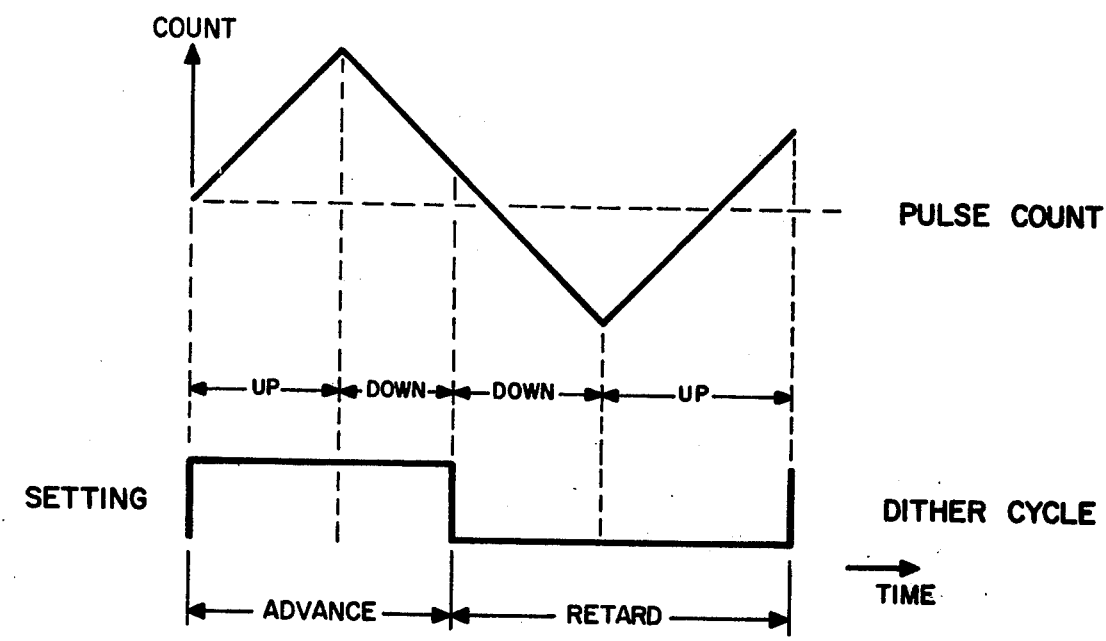
FIG. 2 is a timing diagram useful in understanding the operation of the invention of FIG. 1.

As an aid in understanding the operation of the preferred embodiment of FIG. 1, attention is directed to FIG. 2, which is a diagrammatic representation of a complete dither cycle and the manner in which it is partitioned. It is to be noted that the Advance "half" is shorter than the Retard "half" indicating that biasing is involved. The timing logic including the downcounters 12, 14, 16 and 18 and associated flip-flops and gates divides the complete dither cycle into four segments:

(1) Advance/up-count;
(2) Advance down-count;
(3) Retard down-count; and
(4) Retard/up-count.

The logic counts the celsig pulses received during these segments. If the net count at the completion of a dither cycle is negative, the machine must have appeared to have gained speed during the advance period and further advance of the machine parameter setting is dictated. However, if the net total at the end of the dither cycle is positive, the machine must have appeared to have lost speed during the advance period and a retard of the machine parameter setting is required to improve performance.

With the foregoing background in mind, an explanation will now be given to the mode of operation of the embodiment of FIG. 1.

The clock 10 is a free running oscillator producing output pulses at a desired rate, e.g., 2500 pulses per second. It is to be noted, however, that the pulse rate can be set to yield greater sensitivity or a different dither rate. The output from the clock 10 is applied directly to the digital downcounter 14 and 16, to the downcounter 18 by way of an AND gate 20 and to the downcounter 12 by way of AND gate 11. Each of the downcounters 12, 14, 16 and 18 work in a fashion that a number is initially loaded into them and the clock pulses decrement the content until a zero value is reached. At this time the downcounters provide an output signal indicating that the zero value has been reached.

At the beginning of each dither period, the number $N_1$ indicative of bias adjustment is loaded into the downcounter 12 from a source 22. A binary number $N_2$ representative of the total dither period is loaded into the downcounter 14 from a source 24. The flip-flop 30 is set at the beginning of an advance period (which is coincident with the termination of the retard period) by the output from counter 14. After $N_1$ clock pulses from the clock 10 have been counted, the downcounter 12 will have been decremented to zero and an output signal is produced on line 36 which resets the flip-flop 30. This defines the beginning of the retard period. After enough "new pulses" have been received from the clock 10 such that $N_1$ plus "new pulses" equals $N_2$, the downcounter 14 will produce an output on line 38 to set the flip-flop 30, thereby initiating a new dither cycle.

At the beginning of either the advance or retard period, the output from either counter 14 or counter 12 will pass through OR circuit 40 will provide an enable signal to the counters 16 and 18 to permit the binary numbers from the respective sources 26 and 28 to be entered into their associated downcounters. The output from OR circuit 40 also sets the flip-flops 52 and 58. After $N_3$ clock pulses have been received by the downcounter 16, it will produce an output on conductor 50 for resetting the flip-flop 52. The time required to decrement the contents of the downcounter 16 from its initial value to zero is used to delay the counting of celsig pulses until the system has had time to respond to the dither cycle. When flip-flop 58 is set, AND gate 20 will be enabled, thereby allowing clock pulses from the source 10 to pass therethrough and begin decrementing the content of the downcounter 18. After $N_4$ clock pulses have been received by the counter 18, flip-flop 58 will be reset, thus inhibiting AND gate 20 and stopping counter 18. This continues until either the end of the advance or retard period when, again, the cycle is repeated.

The up/down counter 60 is the device used to tally the number of celsig pulses representative of the machine's output performance during the various time intervals established by the downcounters 12, 14, 16 and 18 and their associated logic circuits. An examination of the inputs to the up/down counter 60 shows that the counter will be counted upward when the advance portion of the dither period and the output of counter 18 are called for as specified by the outputs from the flip-flops 30 and 58 respectively. The counter 60 will be decremented when advance and the $\bar{Q}$ output of flip-flop 58 coincide. The counter 60 will continue to be decremented when retard and the Q output of flip-flop 58 coincide and will be incremented when retard and $\bar{Q}$ output of flip-flop 58 are coincident. Both AND gates 66 and 68 will be disabled when the flip-flop 52 is in its set state by virtue of the $\bar{Q}$ output therefrom which is coupled by way of conductor 72 to the gates 66 and 68. Thus, during the delay period established by the downcounter 16, the counter 60 will not have its contents altered. The counter 60 is reset to zero at the end of the delay period established by the downcounter 16 and at the start of an advance period. This is accomplished by means of the AND gate 82 which is coupled to the Q output of flip-flop 30 and the $\bar{Q}$ output of the flip-flop 52.

The manner in which the contents of the counter 60 are used to generate control signals for adjusting the machine parameter setting will next be described. It can be seen that if the counter 60 passes through zero during the last half of the retard cycle, i.e., a positive accumulation in the counter, a retard correction signal is required. If the counter does not pass through zero during the last half of the retard cycle, an advance control signal is required.

With respect to the Figure, if the $\bar{Q}$ output of flip-flop 30 is high when the counter 60 passes through zero, the flip-flop 96 will be set. This will enable AND gate 102 and disable AND gate 110. Therefore, when the Q output of flip-flop 58 is high, and the Q output of the flip-flop 52 is high for duration of the delay period established by downcounter 16, a retard command will be issued by the AND gate 102 on line 114. Flip-flop 96 will then be reset during the retard period at the beginning of the upcount portion thereof. If at the end of a complete dither cycle the counter 60 did not pass through zero, flip-flop 96 would not be set and at the appropriate time, an advance command would emanate from AND gate 110 on line 116.

Another feature of the device of FIG. 1 which may be advantageously employed is to incorporate a "loading" feature to the counter 60 such that a desired bias value may be entered directly into this counter at the beginning of each operating cycle. Then, instead of beginning each cycle in a cleared or zero state condition, the tally of the up and down counts will begin from a value other than zero. In this fashion, a different machine parameter, other than that being sensed by the celsig unit, can be used to generate the bias value to be preloaded into the counter 60 at the beginning of each dither period. In this sense, the bias value becomes adaptive and is a function of a separate parameter value being monitored. Specifically, considering the environment to be an automobile internal combustion engine, the first parameter control setting may be the spark setting while the second parameter to be monitored may be the exhaust emission. By initially loading the counter 60 with a digital value (bias) indicative of $NO_x$, the optimizer device may be used to home in on an optimum spark setting, off of the value giving MBT (Minimum for Best Torque), to achieve a desired low level of exhaust emission.

The means used to load the counter 60 may, itself, comprise an additional up/down counter having its output stages coupled to corresponding input stages of the counter 60. If an "advance" bias is desired, the additional counter may be controlled to function in its down mode whereas if a "retard" bias is desired, the additional counter may be made to function in its up mode. In either event, the additional counter would be reset within one-half clock time following the load command to the counter 60, so that the additional counter can begin accumulating the bias value to be used on the next succeeding cycle.

Another modification which one skilled in the art might make to the FIG. 1 arrangement if the bias value is to be loaded directly into counter 60, would be to replace counters 12 and 14 with a simple set/reset flip-flop which would establish a 50% duty cycle at that point.

ALTERNATIVE EMBODIMENT

FIG. 3 illustrates by means of a logic block diagram an alternative preferred embodiment which employs unidirectional dithering as distinguished from dithering wherein periodic perturbations are introduced on either side of a desired machine setting which is the case in the FIG. 1 arrangement.

As is illustrated in FIG. 3, there is provided a source of regularly occurring clock pulses 120 having its output connected to the input of a frequency divider 122. The output from the clock 120 is also connected by conductors 124 and 126 to a first input terminal of an AND gate 128 and to the first input terminal of an AND gate 130. The clock output appearing on conductor 124 also is coupled through an inverter 132 to a first input terminal of an AND gate 134.

The output from the frequency divider 122 is coupled to the set input terminal of a set/reset type flip-flop 136. The output from the AND gate 134 is connected to the reset input of the flip-flop 136. The second input to the AND gate 134 comes from the Q output of flip-flop 136 by way of conductors 138 and 140. The Q output from the flip-flop 136 is also applied as a first input to AND gate 142 and through a delay element 143 to AND gates 144 and 146. The output from AND gate 134 is coupled through a delay element 147 and a conductor 148 to the set terminal of a set/reset type flip-flop 150. The Q output of the flip-flop 150 is connected by a conductor 152 back to the second input terminal of the gate 142.

The output from the AND 142 is connected to the toggle (T) input of a toggle type flip-flop 154. This flip-flop has its Q output connected to the second input of the AND gate 144 and its $\bar{Q}$ output connected to the second input of the AND gate 146. A conductor 156 couples the Q output from the toggle flip-flop 154 to the select input of a multiplexer 158. The multiplexer 158 has a first set of inputs 160 coming from a register 162 and a second set of inputs 164 coming from a second register 166. As will be explained more fully hereinbelow, the registers 162 and 166 are considered to be a source of binary numbers and may alternatively be read only devices or devices whose contents can be entered from an external source (not shown) and are used for establishing a desired bias condition.

The output from the multiplexer 158 is coupled to a downcounter (DC1) identified by numeral 168. Depending upon whether the select signal on the line 156 is a binary high or a binary low value either the inputs 160 or 164 will be coupled to the downcounter 168 by way of the multiplexer 158. Specifically, if the signal on line 156 is high, the outputs from the source 162 will be coupled to the inputs of the downcounter 168 whereas if the select signal on the line 156 is a binary low value, the contents of the source 166 will be transferred through the multiplexer 158 to the downcounter 168. It is to be noted that the downcounter 168 has its load enable terminal 170 connected to the Q output of flip-flop 136 by way of conductors 138, 172 and 174.

The output from the downcounter 168 is connected to the reset input terminal of a set/reset type flip-flop 176. The set terminal of this flip-flop is connected to a junction point 178 on conductor 174 by means of a conductor 180. The Q output from the set/reset flip-flop 176 is connected by a conductor 182 to the second input of AND gate 128.

The output from AND gate 130 is connected to the decrement input terminal of a second downcounter 184 (DC2) whose output is connected to the set input terminal of a set/reset type flip-flop (FF3) 186. The reset input terminal of this last mentioned flip-flop is also coupled to the Q output terminal of flip-flop 136 by way of conductors 138, 172, 174, 180 and 188. The $\overline{Q}$ output from flip-flop 186 is connected by a conductor 190 to the second input terminal of the AND gate 130.

The Q output from flip-flop 186 is connected by a conductor 192 to first input terminals of a pair of AND gates 194 and 196. A second input to AND gates 194 and 196 comes from the output of the celsig device (not shown) by way of input terminal 198. The flip-flop 176 has its $\overline{Q}$ output connected to a third input of the AND gate 194 and its Q output connected to a third input of the AND gate 196. The output from gate 194 is connected to the "Count Down" input terminal of up-/down counter 200. Correspondingly, the output from AND gate 196 is connected to the Count Up input terminal of the up/down counter 200. The counter 200 also has a reset terminal which is connected to the Q output of the flip-flop 136 by way of conductor segments 138 and 172. The output from the up/down counter 200 is connected to the reset input terminal of set/reset type flip-flop 150.

The output from AND gate 144 appearing at terminal 202 is adapted to be connected to a system parameter control device (not shown) and signals appearing at this terminal are effective to adjust the setting thereof in the "advance" direction. Similarly, the output from AND gate 146 appearing at terminal 204 is adapted to be connected to the system parameter control device (not shown) for incrementally adjusting the parameter setting in the "retard" direction as pulses are developed at the terminal 204.

Figure 4:
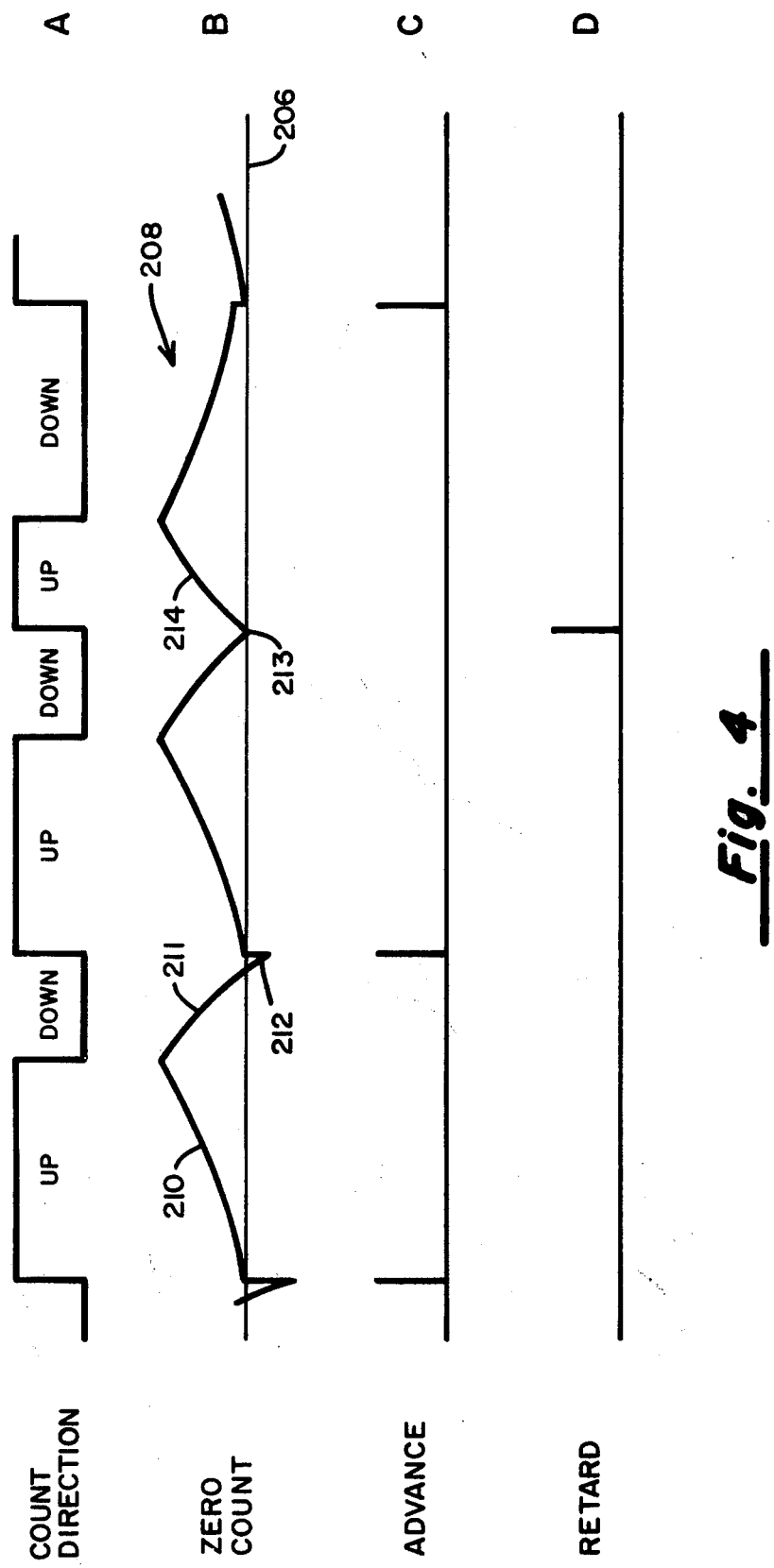
FIG. 4 is a timing diagram useful in understanding the operation of the alternative embodiment of FIG. 3.

Now that the details of the construction of the alternative embodiment of FIG. 3 have been described, consideration will be given to the mode of operation thereof. In this regard, the waveform of FIG. 4 is deemed to be illustrative and helpful.

As in the embodiment of FIG. 1, the clock 120 in FIG. 3 is a source of regularly occurring pulses, the frequency or repetition rate of which is based upon the desired granularity of the bias adjustment to be obtained. It has been found that a repetition rate of 3200 pulses per second is satisfactory for most applications.

The output from the clock 120 is applied to a frequency divider 122 which is arranged to divide by 160 such that it produces at its output a pulse approximately every 50 milliseconds, assuming a clock frequency of 3200 pps. It is to be understood, however, that these values are elemplary only and depend, somewhat, on the characteristics of the system with which the invention is employed.

In explaining the operation of the circuit of FIG. 3, it is assumed to begin at the instant that the frequency divider 122 outputs a leading edge signal to the flip-flop 136. Flip-flop 136 will be momentarily set until it is again reset by a clock pulse passing through the inverter 132 and the AND gate 134. The inverter 132 operates to cause the flip-flop 136 to be reset on the trailing edge of the clock pulse following the last preceding leading edge from the frequency divider 122. Thus, the flip-flop 136 produces an output pulse having a width equal to the on time of the clock pulse.

The output from AND gate 134 is delayed by element 147 and applied by way of conductor 148 to the set input terminal of the set/reset flip-flop 150.

The setting of the flip-flop 136 also enables the loading of the counter "DC1" (168) and "DC2" (184) and it resets the up/down counter 200. The Q output from flip-flop 136 also sets the flip-flop 176 and clears the flip-flop 186.

The particular value loaded into the downcounter 168 is dependent upon the current state of the toggle flip-flop 154. If flip-flop 154 is in a state where the Q output thereof is high, the signal on conductor 156 will control the multiplexer 158 such that the binary value contained in the register 162 will be transferred through the multiplexer to the downcounter 168 in response to the load enable at terminal 170 which exist during the short interval that the flip-flop 136 is set. However, if the toggle flip-flop 154 were in its opposite state, then the signal on conductor 156 would be such as to cause the multiplexer 158 to transfer the contents from the register 166 into the downcounter 168. The digital values, N1A and N1B, determine the bias which will be utilized in the system. The reason for the two bias values N1A and N1B is that if, for example, a retard bias is desired, then during a retard setting period, the upcount time developed by the counter 168 must be shorter than the remaining time in the period, i.e., the downcount time. Similarly, if an advance setting period is being called for, the upcount period generated by counter 168 must be longer than the corresponding downcount period. This situation will be further described when the waveforms of FIG. 4 are discussed. Of course, if advance bias rather than retard bias is desired, the inverse situation would pertain. The values N1A and N1B are generally quite close to one another, but differ depending upon the degree of bias desired. The amount of bias desired determines how much the N1A and N1B values differ and the direction of the bias determines which of the two values is the larger. The value N2, as contained in the register 185, is dependent upon the inertia of the system with which the optimizer of the present invention is employed. If the inertia of the system is large, it necessarily takes a longer time for the system to begin to respond to a change in the setting and therefore the value N2 will be relatively high. However, if the invention is being used to improve the performance of a low inertia system, then the value N2 may be considerably lower. In any event, each of the values N1A or N1B are greater than the value N2.

Returning again to the operational description, the particular value entered into the counter 168 via multiplexer 158 will depend upon the present state of the toggle fip-flop 154. Let it be assumed that the signal on line 156 is high so that the digital N1A is entered into the downcounter 168. As has already been mentioned, the flip-flop 176 is in its set condition so that the signal on conductor 182 enables AND gate 128 to permit clock pulses to propagate therethrough and begin decrementing the downcounter 168. Similarly, since flip-flop 186 was reset by the output from flip-flop 136 its $\overline{Q}$ output will be high, thereby enabling AND gate 130, allowing clock pulses to also propagate through it to decrement the downcounter DC2 184. Both counters 168 and 184 will be decremented at the same rate and since, as was mentioned, the initial value loaded into counter 184 is less than the value originally entered into the counter 168, the counter 184 will decrement to zero earlier than will the counter 168. Hence, when this happens, the flip-flop 186 is set causing a high signal to be applied to an input of the gates 194 and 196 to partially enable same, such that celsig pulses applied to the terminal 198 may pass through either the gate 194 or the gate 196, depending upon the particular state of the flip-flop 176. It is also to be noted that the setting of the flip-flop 186 causes a low signal on conductor 190 to block further clock pulses from passing through the AND gate 130 and stimulating the counter 184.

At a later time, the clock pulses passing through the AND gate 128 will decrement the downcounter 168 to zero, producing an output signal which resets the flip-flop 176 such that the AND gate 194 is fully enabled to allow the celsig pulses 198 to decrement the up/down counter 200. Prior to the resetting of the flip-flop 176, and coincident with the setting of the flip-flop 186, the AND gate 196 was enabled to allow the celsig pulses applied to terminal 198 to increment the up/down counter 200.

The next thing which happens is dependent upon whether the density of the pulses from the celsig device, as applied to terminal 198, were greater during the upcount period than during the downcount period of the up/down counter 200. Assuming that more downcount pulses were passed by the AND gate 194 than upcount pulses were passed by AND gate 196, the counter 200 will be decremented through zero, producing an output which resets the flip-flop 4 (150). When flip-flop 150 is reset, the Q output thereof on line 152 goes low, thereby disabling AND gate 142. What this indicates is that a greater pulse density existed in the second half of the period than had occurred in the first half of the period.

As long as the gate 142 is disabled, the flip-flop 154 is precluded from toggling. Accordingly, at the beginning of the next period defined by the setting of the flip-flop 136, the flip-flop 154 will remain in its prior state and a control pulse will be developed on the same output terminal 202 or 204 as did the preceding control pulse of the prior cycle. Thus, the system senses whether the preceding change improved the performance and, if so, another incremental variation is made to the system's parameter setting in the same direction and a determination is made as to whether performance is again improved. In this fashion, adjustments will be made in the same direction so long as each individual adjustment results in improved performance. However, if an adjustment is made which results in the up/down counter 200 not being decremented through zero, which means that the pulse density was less in the second half than it was in the first half, then the flip-flop 150 will not be reset and the signal on line 152 will remain high to enable the AND gate 142. The pulse output from the flip-flop 136 will then pass through the AND gate 142 to toggle flip-flop 154 to its opposite state. Toggling of the flip-flop 154, of course, shifts the enable on the AND gates 144 and 146 such that a setting control signal will be developed on either the terminal 202 or the terminal 204, depending upon which was stimulated on the immediately preceding cycle.

Referring now to the waveforms of FIG. 4, which illustrate the pertinent timing diagram for the circuit of FIG. 3, the waveforms are drawn to indicate an exaggerated retard bias. The waveform, A, in FIG. 4 indicates the count direction as indicated by the outputs from the gates 194 and 196 in FIG. 3. It is to be noted that the "up" period is longer than the "down" period.

In the waveform B, the horizontal line 206 represents the zero count level of the counter 200 in FIG. 3. The curve, indicated generally by numeral 208, represents the contents of the counter 200 at any given instant in time. The segment of the wave 208 indicated by numeral 210 is concave in nature and increasing which indicates that the pulse density is increasing which, in turn, indicates that the device with which the optimizer is being used is speeding up. The segment of waveform 208 identified by numeral 211 is somewhat convex and downward sloping. This indicates that the counter 200 is being decremented by celsig pulses at a slower rate initially toward the top of the waveform and at a substantially higher rate as the waveform approaches and passes through the zero count level 206. Thus, it can be seen that the apparatus being controlled continues to have improved performance during the sampling cycle represented by the time periods established by the downcounter 168. Since the waveform passes through zero, as at 212, the flip-flop 150 in FIG. 3 does get reset so as to disable the AND gate 142 and prevent the toggling of the flip-flop 154. Because the flip-flop 154 is prevented from being toggled, the signal on the select line 156 for the multiplexer 158 remains the same as in the preceding cycle so that again, a similar "up" - "down" cycle is repeated.

Following the second cycle of operation, it can be seen by observing point 213 that at the conclusion of the downcount period, the contents of the counter 200 do not pass through the zero count level 206. As a result, the flip-flop 150 remains in its set state and the gate 142 is enabled to pass a pulse to the toggle flip-flop 154, thereby switching its state. Switching the state of the toggle flip-flop reverses the select signal on line 156 from its prior value and causes the multiplexer 158 to select the inputs 164 from the source 166 rather than the inputs 160 from the source 162. Accordingly, a differing value is loaded into the downcounter DC1 168. With respect to waveform A in FIG. 4, it can be seen that now the upcount period of the counter 200 is sustantially shorter than was the case previously and similarly, the downcount period is longer.

By observing the slope of the segment 214 of waveform 208, it may be noticed that the device is operating on the retard side of optimum rather than on the advance side. Accordingly, this will cause the system with which the optimizer device is employed to decrease its output. Accordingly, the curvature of the waveform segment 214 changes from concave (as at 210) to convex. At the conclusion of the downcount period, the counter 200 has not passed through its zero count level and, again, the flip-flop 150 remains set to hold the gate 142 enabled, allowing the toggle flip-flop 154 to switch states.

The waveforms C and D in FIG. 4 are intended to indicate the outputs appearing at the terminals 202 and 204, respectively. As the optimizer circuit of FIG. 3 homes in on the optimum setting or the setting determined by the bias value away from optimum, there will be alternate advance, retard, advance, retard, etc. pulses produced at terminals 202 and 204, assuming that the operator does not vary the parameter setting to initiate a new series of sample-correct steps.

The above described implementations of the present invention employ discrete digital components, such as counters, gates, flip-flops, etc., it being recognized, however, that economies can be realized through the use of large scale integration (LSI) technology to implement much of the digital logic on a single chip. It is also recognized that it would be a relatively simple matter for one skilled in the art to program a commerically available microprocessor to emulate the functions carried out in the discrete component arrangement disclosed herein as a preferred embodiment. For example, an INTEL 8080 microprocessor includes a register stack coupled with an incrementer/decrementer device, an accumulator, and an arithmetic logic unit, all under control of an instruction decode unit and associated timing and control unit. A read-only memory for storing a program of micro-instructions and other constants may be coupled to the 8080's data bus. As such, this microprocessor is well suited for executing the "optimizing" function described heretofore.

Under program control, the initial values entered into the counters 12, 14, 16 and 18 of FIG. 1 may be entered into the register stack of the 8080 from the ROM and the incrementer/decrementer may be used to count down these values to zero. Also, the celsig pulses indicative of the output of the system being "optimized" may be entered via the computers I/O bus into the accumulator to develop a tally during the prescribed sampling intervals. By executing a "compare" instruction, a determination can be made as to whether the number of celsig pulses increased or decreased during the intervals that the registers in the register stack are being decremented. Based upon this comparison operation, an "external function" operation may be executed whereby the 8080 microprocessor delivers a command to the system being optimized for adjusting the parameter setting.

It is to be noted that the optimizing operation is relatively slow (milliseconds) as compared to the speed of most microprocessors (nanoseconds). Hence, the optimizing function can be time shared with other microprocessor controlled operations on the same system.

While there has been shown and described first and second alternative embodiments of our invention and the best mode contemplated for practicing same, it is to be understood that modifications of the invention will become apparent to one of ordinary skill in the art upon reading the foregoing disclosure. Specifically, many other types of circuits could be used. For example, the up/down counter could be replaced with an analog integrator, but that would be more susceptible to noise. Also, it is contemplated that a commercially available microprocessor can be programmed to perform the desired functions but at a higher cost. Accordingly, the scope of the invention is to be determined from the appended claims.

What is claimed is:

1. In an electronic control system for optimizing the performance of an energy consuming device of the type including means for perturbating a device control parameter with respect to a given setting, pulse producing means for generating pulses at a rate proportional to the instantaneous output of the device, correlator means for detecting the effect of said perturbating on said pulse rate and means responsive to said correlator means for producing control signals for adjusting said given setting in a direction to enhance the performance of the energy consuming device, the improvement comprising:
(a) a first decrementable digital counter connected to receive an initial value corresponding to a predetermined time segment of a device setting perturbating cycle;
(b) a second decrementable digital counter connected to receive an initial value corresponding to the complete device setting perturbating cycle time;
(c) a clock source of regularly occurring timing pulses connected to said first and second decrementable counters for decrementing said first and second decrementable counters at a fixed rate;
(d) an up/down digital counter; and
(e) logic circuit means coupling said up/down counter, to said pulse producing means and to said first and second decrementable counters for accumulating the algebraic difference in the number of pulses from said pulse producing means occurring during predetermined segments of said device setting perturbating cycle.

2. Apparatus as in claim 1 and further including:
(a) additional logic circuit means coupled to said first and second decrementable counters and to the output of said up/down counter means for producing a first of said control signals when the contents of said up/down counter is a positive value at the time said second decrementable counter is decremented to zero and a second of said control signals when the contents of said up/down counter is a negative value at the time said second decrementable counter is decremented to zero.

3. Apparatus as in claim 2 and further including:
(a) a third decrementable digital counter coupled to receive decrementing pulses from said clock source and adapted to be loaded with a binary number indicative of a predetermined delay period when either said first or said second decrementable digital counter is decremented to zero;
(b) a fourth decrementable digital counter adapted to be loaded with a binary number indicative of a predetermined fraction of said predetermined time segment of said machine setting perturbating cycle;
(c) means controlled by said first, second and third decrementable digital counters coupling said clock source to said fourth decrementable digital counter such that said fourth counter is decremented only during the delay period during which said third counter is being decremented; and
(d) means connecting said third and fourth decrementable digital counters to said logic circuit means and to said additional logic circuit means.

4. Apparatus for monitoring the performance of an energy consuming system and for adjusting a parameter control setting of the system that the performance is enhanced comprising:
(a) means for producing pulse-type signals at a rate indicative of instantaneous system performance;
(b) first digital counting means coupled to receive said pulse-type signals for tallying the difference between the number of pulses received from said first mentioned means during a first predetermined time interval and a second predetermined time interval;
(c) a source of regularly occurring timing pulses;
(d) control means for said first digital counting means including a second digital counting means adapted to be initially loaded with a digital value establishing said first and second predetermined time intervals and connected to said source of regularly occurring timing pulses such that said initial value is changed upon receipt of each of said timing pulses;
(e) means coupling said control means to said first digital counting means; and
(f) logic circuit means coupled to the output of said first digital counting means and to the output of said second digital counting means for producing a parameter setting adjustment signal which is dependent on the contents of said first digital counting means at the end of said second predetermined time interval.

5. Apparatus as in claim 4 wherein said second digital counting means includes:
(a) a digital counter adapted to be initially loaded with a digital value which is a predetermined fraction of said initial value loaded into said second digital counting means;
(b) means coupling said source of regularly occurring timing pulses to said digital counter for periodically changing the contents of said digital counter from said initial value; and
(c) means coupling the output of said digital counter to said control means and to said logic circuit means, the arrangement being such that when said digital counter has its contents changed to a predetermined value, said parameter setting adjustment signal is produced.

6. Apparatus for continuously determining the response of an energy consuming system of iterative incremental variations of a first parameter of said system and for producing corrective signals to adjust said first parameter so that the difference between iterative system performance responses is reduced to a minimum at an adjustment setting of said first parameter which is biasable in response to at least one of several other parameters of said system, comprising:
(a) a first pulse source for producing pulses indicative of system performance;
(b) a second pulse source for determining the rate at which said first parameter is incrementally varied;
(c) first correlation means responsive to pulses from said first and second pulse sources to determine the response in performance of said system to said incremental variations of said first parameter, said first correlation means including at least one digital counter;
(d) loading means for loading said one digital counter with values representing a desired bias in the adjustment setting of said first parameter, so that said digital counter produces difference signals indicative of the deviation in the adjustment of said parameter from said desired bias; and
(e) second correlation means responsive to said difference signals for producing a signal to adjust said first parameter in the direction towards that setting which is the setting of said first parameter at said desired bias.

7. A system for monitoring the performance of an energy consuming system and for adjusting a parameter control setting of the system such that the performance of the system is enhanced, comprising:
(a) a first source of regularly occurring clock pulses of a frequency, $f_1$;
(b) frequency divider means coupled to said source for producing at its output pulses of a frequency which is a submultiple of said frequency, $f_1$;
(c) a first counter adapted to be alternatively loaded with a first and a second digital number indicative of a predetermined bias value;
(d) time interval control means responsive to the output from said frequency divider means for controlling the loading of said first and second digital values into said first counter and for coupling the clock pulses to said first counter for altering said digital number at said frequency, $f_1$;
(e) a second source of pulses, the instantaneous frequency of which is indicative of the performance of said energy consuming system;
(f) a second counter coupled to said second source and to said first counter for tallying the difference between number of pulses received from said second source during separate time intervals; and
(g) logic circuit means connected to the output of said second counter and to said time interval control means for producing parameter setting control signals in successive iterative steps at the initiation of each pulse from said frequency divider means.

8. Apparatus as in claim 7 wherein said time interval control means further includes:
(a) delay means for establishing a predetermined delay period following the initiation of each pulse from said frequency divider means; and
(b) means coupling said delay means to the inputs of said second counter for controlling the entry of said pulses from said second source into said second counter.

9. Apparatus as in claim 7 wherein said logic circuit means comprises:
(a) a set/reset flip-flop connected to be set at the initiation of each pulse from said frequency divider means and to be reset only when the contents of said second counter reach a predetermined value;
(b) a toggle flip-flop;
(c) gating means coupling the output of said set/reset flip-flop to the input of said toggle flip-flop and adapted to be enabled at the initiation of each pulse from said frequency divider means; and
(d) further gating means coupled to the output of said toggle flip-flop and adapted to be enabled at the initiation of each pulse from said frequency divider means.

* * * * *